US009587801B2

(12) United States Patent
Chen et al.

(10) Patent No.: US 9,587,801 B2
(45) Date of Patent: Mar. 7, 2017

(54) ZOOM UNIT, A LIGHT ENGINE HAVING THE ZOOM UNIT AND AN ILLUMINATING APPARATUS

(75) Inventors: WeiHuang Chen, Shenz hen Guangdong (CN); Ai Ma, Foshan Guangdong (CN); SiXiong Zeng, Shenz hen Guangdong (CN); Haiqiang Zhong, Shenz hen Guangdong (CN)

(73) Assignee: OSRAM GmbH, Munich (DE)

( * ) Notice: Subject to any disclaimer, the term of this patent is extended or adjusted under 35 U.S.C. 154(b) by 418 days.

(21) Appl. No.: 14/233,073

(22) PCT Filed: Jun. 1, 2012

(86) PCT No.: PCT/EP2012/060417

§ 371 (c)(1),
(2), (4) Date: Feb. 14, 2014

(87) PCT Pub. No.: WO2013/010712

PCT Pub. Date: Jan. 24, 2013

(65) Prior Publication Data

US 2014/0168966 A1 Jun. 19, 2014

(30) Foreign Application Priority Data

Jul. 15, 2011 (CN) .......................... 2011 1 0199277

(51) Int. Cl.

| | |
|---|---|
| ***B60Q 1/26*** | (2006.01) |
| ***F21V 13/04*** | (2006.01) |
| ***F21V 7/00*** | (2006.01) |
| ***F21V 14/04*** | (2006.01) |
| ***F21V 14/00*** | (2006.01) |

(Continued)

(52) U.S. Cl.

CPC ................ *F21V 13/04* (2013.01); *F21K 9/60* (2016.08); *F21V 7/0025* (2013.01); *F21V 7/0083* (2013.01); *F21V 14/00* (2013.01); *F21V 14/04* (2013.01); *F21V 33/0068* (2013.01); *F21W 2131/205* (2013.01); *F21Y 2101/00* (2013.01)

(58) Field of Classification Search

CPC ...... F21V 13/04; F21V 15/00; F21V 33/0068; F21K 9/58

USPC ....... 362/232, 328, 299, 237, 241, 33, 249.1

See application file for complete search history.

(56) References Cited

U.S. PATENT DOCUMENTS 4,037,096 A * 7/1977 Brendgord ............ F21V 7/0008 362/294
4,400,765 A * 8/1983 Kochem ............... F21V 7/0008 362/277

(Continued)

FOREIGN PATENT DOCUMENTS

CN 1246592 3/2000
CN 1353268 6/2002

(Continued)

*Primary Examiner* — Bryon T Gyllstrom
(74) *Attorney, Agent, or Firm* — Cozen O'Connor

(57) ABSTRACT

A zoom unit (1) of a light engine (5), comprising at least one lens (2), at least one first reflector (3) and at least one second reflector (4), other at least one lens (2) receives a collimated beam (LI) from a light source unit (6) of the light engine (5), the collimated beam (LI) being incident on the first reflector (3) after being converged by the lens (2), and being incident on the second reflector (4) after being reflected by the first reflector (3), to produce an output beam (L4) with its beam angle changed.

17 Claims, 7 Drawing Sheets

(51) Int. Cl.

| | |
|---|---|
| ***F21V 33/00*** | (2006.01) |
| *F21W 131/205* | (2006.01) |
| *F21Y 101/00* | (2016.01) |

(56) References Cited

U.S. PATENT DOCUMENTS

| | | | | |
|---|---|---|---|---|
| 5,136,413 | A * | 8/1992 | MacDonald | G02B 27/0025 250/236 |
| 6,454,437 | B1 * | 9/2002 | Kelly | G01J 3/10 359/287 |
| 6,840,654 | B2 * | 1/2005 | Guerrieri | F21V 29/83 362/241 |
| 8,052,309 | B2 * | 11/2011 | Dyson | F21S 10/00 359/196.1 |
| 2002/0085379 | A1 * | 7/2002 | Han | H01L 33/54 362/227 |
| 2004/0085779 | A1 * | 5/2004 | Pond | B60Q 1/04 362/516 |
| 2005/0138852 | A1 | 6/2005 | Yamauchi | |
| 2005/0195599 | A1 | 9/2005 | Marka | |
| 2009/0273735 | A1 * | 11/2009 | Yeh | G02F 1/133603 349/67 |
| 2010/0194312 | A1 | 8/2010 | Bohn et al. | |
| 2011/0068708 | A1 | 3/2011 | Coplin et al. | |
| 2011/0228534 | A1 * | 9/2011 | Zhang | F21S 6/002 362/240 |

FOREIGN PATENT DOCUMENTS

| | | |
|---|---|---|
| CN | 101270863 | 9/2008 |
| CN | 201462503 | 5/2010 |
| FR | 1 228 846 | 9/1960 |
| GB | 375 943 | 7/1932 |
| JP | 2007 287566 | 11/2007 |

* cited by examiner

ZOOM UNIT, A LIGHT ENGINE HAVING THE ZOOM UNIT AND AN ILLUMINATING APPARATUS

RELATED APPLICATIONS

This application is a U.S. National Phase Application under 35 USC 371 of International Application PCT/EP2012/060417 filed Jun. 1, 2012.

This application claims the priority of Chinese application No. 201110199277.8 filed Jul. 15, 2011, the entire of which is hereby incorporated by reference.

FIELD OF THE INVENTION

The present invention relates to a zoom unit of a light engine, particularly a light engine for medical application, a light engine having such zoom unit and an illuminating apparatus.

BACKGROUND OF THE INVENTION

At present, the LED products are widely used in daily life. The LED (light emitting diode) has been gradually replacing the traditional halogen lamp as it has a stable property, is easily manufactured with a low cost and has the advantage of low power consumption. However, in a situation where a high light brightness and efficiency are required, e.g. in surgery, an illuminating apparatus quite matched with the application field is demanded for obtaining the effect of a lamp with uniform and shadowless illumination. Thus, a halogen bulb is still used. In view of the disadvantages such as high power consumption of the halogen bulb, the customer desires to obtain a solution capable of replacing the halogen bulb with the LED.

SUMMARY OF THE INVENTION

Therefore, one object of the present invention lies in providing a zoom unit of a medical light engine. The zoom unit cooperated with a multipoint light source such as LED light source unit mounted in the light engine, without changing an outer structure or profile of the illuminating apparatus, zooms emergent light from the LED light source unit, so as to realize effect of a shadowless lamp. The LED light sources can be of any color or white, for medical applications preferably of white color with a certain color temperature, for example between 2800 K and 8000 K, and a certain color rendering index (color rendition). However, this invention is not limited to white light applications.

Said object of the present invention is accomplished via one aspect of the present invention directed to a zoom unit of a medical light engine. The zoom unit comprises at least one lens, at least one first reflector and at least one second reflector, the at least one lens receiving a collimated beam from the light source unit of the light engine, the collimated beam is incident on the first reflector after being converged by the lens, and is incident on the second reflector after being reflected by the first reflector, to produce an output beam with its beam angle changed. Through such structure of the zoom unit, the collimated beam emitted from the light source unit can be mixed sufficiently with the smallest light loss and the angle of the beam can be changed, thereby assuring the emergent beam similar to that of a halogen lamp also may be obtained without change of the reflector cover of traditional illuminating apparatus.

According to a preferred solution in the present invention, the lenses are donut-like lenses (i.e. circular, symmetrical, with a hole in the middle; in the following called: donut-lenses). To provide the lenses to be donut can uniformly converge an incident beam from the light source to a greatest degree and avoid the light loss.

According to a preferred solution in the present invention, the first reflector is faceted disk reflector arranged in a row with respective lens. A plurality of first reflectors that are arranged in a row with the respective lenses in a light emergent direction and downstream from the respective lenses reflect the beams converged by the lenses towards the second reflector located in a center, for improving the light efficiency and assuring the desired primary reflected beams.

According to an improved solution in the present invention, the second reflector is a reflector in a horn shape. Respective reflecting surfaces of the second reflector in a horn shape are oriented to the first reflector, and the primary reflected beams, upon reaching the reflecting surfaces of the second reflector, are secondly reflected as the output beam.

Another object of the present invention is to provide a light engine having the zoom unit. The same light distribution may be obtained by replacing the traditional halogen lamp with the light engine according to the present invention to be mounted in an illuminating apparatus; moreover, the energy consumption of the illuminating apparatus can be advantageously saved.

Preferably, the light engine further comprises a light source unit composed of a plurality of LED sub light source units. The light source unit composed of the LED sub light source units not only has the merits of a low cost and strong stability but also has the advantages of a small volume compared with the traditional halogen bulb. Therefore, a higher brightness can be obtained in the same space.

Preferably, the light source unit comprises a plurality of LED sub light source units each comprising at least one LED and an optical device corresponding to the at least one LED.

The optical device is configured to modify beams from LED to be approximately collimated beams. The optical device configured to change the beams from the respective LED may correspond to one or more LEDs, for instance, the LED may be mounted in such optical device in a one-to-one relationship or many-one relationship with the optical device.

According to an embodiment of the present invention, the optical device includes at least one lens accommodating the LED therein and at least one primary reflector arranged outside of periphery of each lens. The optical device with simple construction is configured to modify beams from LED to be approximately collimated beams.

Preferably, each LED sub light source unit comprises one LED, one lens and one primary reflector. Thus, it can assure the beams from the LED light sources can be emitted after collimation.

Each LED sub light source unit is in a honeycomb arrangement, thus further assuring the compactness of the whole light engine structure and further improving the output light efficiency.

Preferably, each lens is in an approximately cylinder shape. The cylinder-shaped lens may enclose the LED therein so as to change the direction of the beam emitted from the LED light source unit while mechanically protecting the LED.

According to an embodiment of the present invention, each lens is a total internal reflection lens. The light efficiency of the light engine according to the present invention can thus be advantageously improved.

According to an embodiment of the present invention, the light engine includes at least one, preferably a plurality of lens boards each provided with a part of lenses among all the lenses. Different numbers of the lens boards may be combined according to practical usage requirements so as to obtain light engines suited to respective application purposes.

In an embodiment of the present invention, a cross section of each primary reflector is in a hexagonal shape constructed by six reflecting portions each forming an edge of the hexagonal shape. Such structure can accomplish a compact arrangement.

Preferably, each lens is located in a corresponding primary reflector in a hexagonal shape. Particularly preferably, each lens is located in a center of the corresponding primary reflector in a hexagonal shape. Using the primary reflector in a hexagonal shape to enclose the lens located therein, especially in the center, can assure the same reflection to all emergent beams from the light source passing through the lens, and moreover, it is further favorable for the compact arrangement.

According to an embodiment of the present invention, respective primary reflectors with a cross section in a hexagonal shape are connected with each other to form a honey-comb layout. A compact and stable structure may be realized via the honeycomb layout. Thereby, a space occupied by the primary reflectors is minimized while assuring the brightness of the light engine unchanged.

According to an embodiment of the present invention, the light engine further comprises a plurality of primary reflector boards each distributed with a part of the primary reflectors among all the primary reflectors. Since the light engine includes a plurality of lens boards, such configuration may enable the lens on each lens board and the primary reflector on each primary reflector board preferably to correspond to each other.

According to an embodiment of the present invention, each primary reflector board may be mounted on each corresponding lens board so as to accommodate respective lens in respective primary reflector to form an LED light source module that can be assembled with each other. The respective primary reflector board and the respective lens board are mounted together, which is favorable to updating or replacing any one part thereof.

According to an embodiment of the present invention, there are six LED light source modules, respective primary reflector boards are combined with each other to form a light source unit in an approximately hexagonal shape. Six primary reflector boards of the six LED light source modules are connected together in turn via edges of their own to form a light source unit in a hexagonal shape, which is favorable for obtaining a uniform light distribution.

Preferably, the respective LED sub light source units jointly form a surface light source substantially in the same plane so as to realize uniform illumination of the surface light source with a high light intensity.

And still another object of the present invention lies in providing a medical illuminating apparatus. The illuminating apparatus comprises a light engine having the above features and a reflecting cover configured to mount the light engine, the reflecting cover enclosing the light engine for forming light output from the light engine into a convergent column light after being reflected by the reflecting cover. Compared with the traditional illuminating apparatus, such illuminating apparatus has the same outer shape but has all merits of the LED illuminating apparatus, such as a low cost and a high light efficiency, since it uses the LED as the light source.

According to an embodiment of the present invention, the reflecting cover and the zoom unit of the light engine are correspondingly provided. The approximately straight beam emitted from the light engine may be reflected on an inner wall of the reflecting cover, and may preferably render the effect similar to that of a shadowless lamp or other expected illuminating effects upon corresponding modifications.

It should be understood that the general descriptions above and the detailed descriptions below are illustrative for the purpose of further explaining the required present invention.

BRIEF DESCRIPTION OF THE DRAWINGS

In the drawings, the same element is represented by the same reference sign, wherein.

DETAILED DESCRIPTION OF THE DRAWINGS

Figure 1:
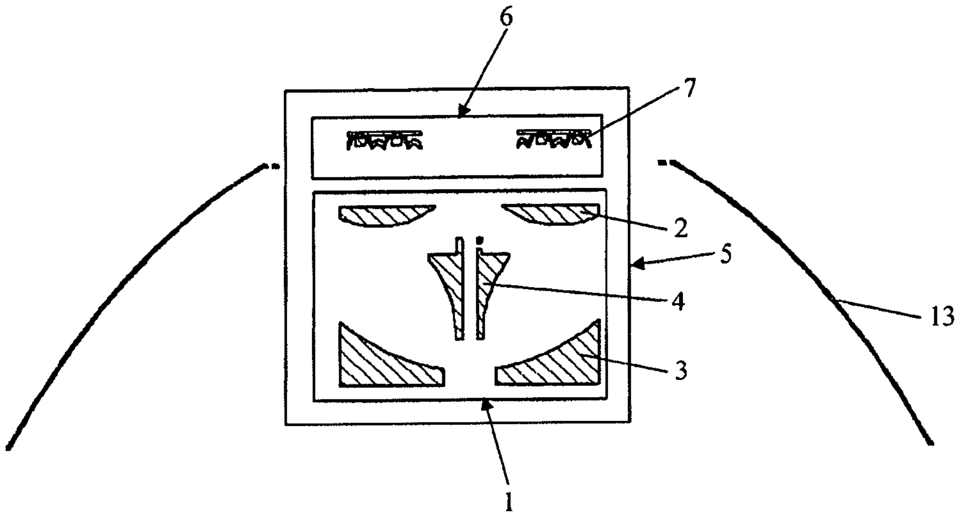
FIG. 1 is a sectional top view of an illuminating apparatus according to an embodiment of the present invention.

FIG. 1 is a sectional top view of an illuminating apparatus according to the present invention. The illuminating apparatus according to the present invention has a light engine 5 and a reflecting cover 13 configured to mount and enclose the light engine 5, wherein the light engine 5 comprises an LED light source unit 6 and a zoom unit 1 behind the LED light source unit 6. The LED light source unit 6 and the zoom unit 1 may be housed separately or jointly.

The reflecting cover 13 is the same as the reflecting cover 13 of an illuminating apparatus using a halogen light source in the prior art. The difference is replacing a halogen lamp light source with the LED light source unit 6 and the zoom unit 1, to provide an LED light and zoom beam, realizing illumination with a high light efficiency and a high brightness in a compact space. LED light source unit 6 and zoom unit 1 are firstly provided by the inventor and the two units can cooperated with each other or independent from each other, such as the zoom unit 1 may cooperate with other light source unit.

Figure 4:
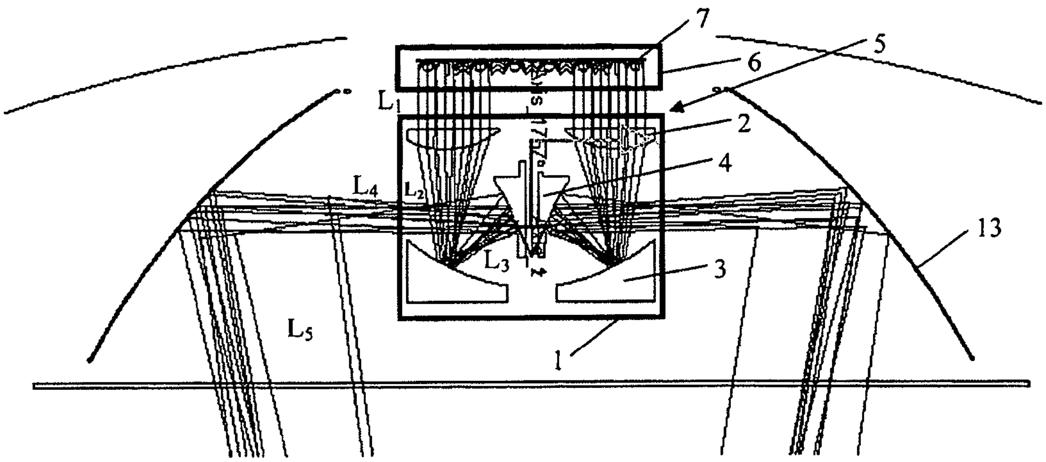
FIG. 4 is a light path diagram of an illuminating apparatus according to an embodiment of the present invention.
Figure 5A:
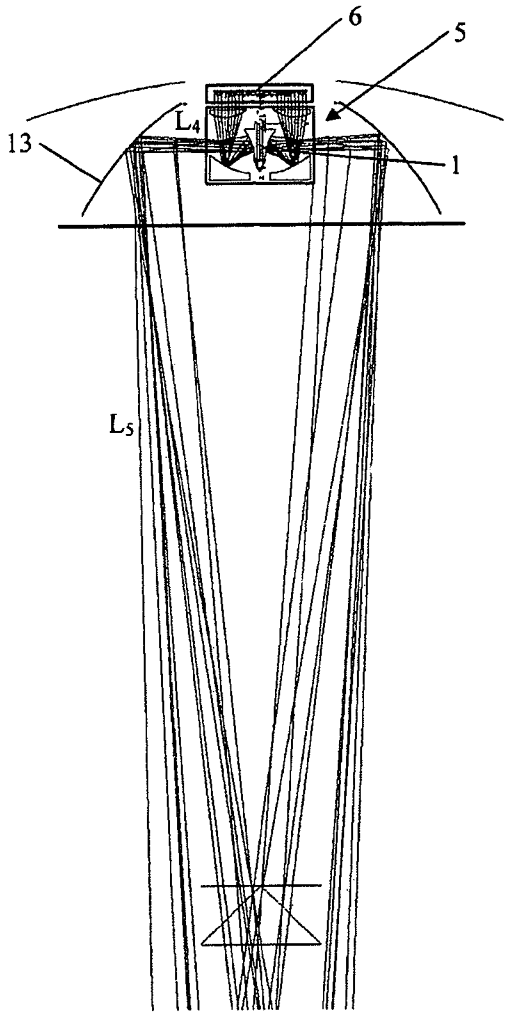
FIGS. 5*a*-5*c* are light path diagrams in three different embodiments of an illuminating apparatus according to the present invention.
Figure 5B:
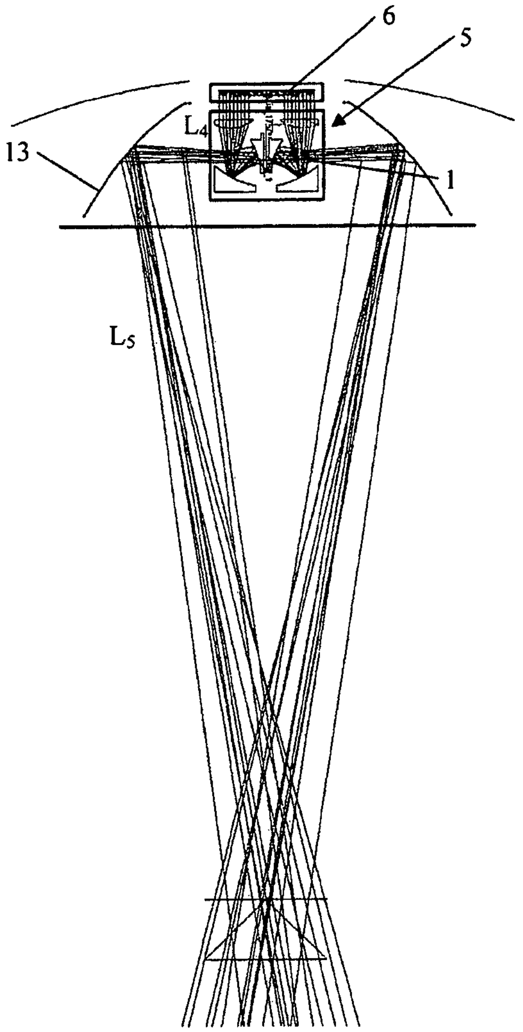
Figure 5C:
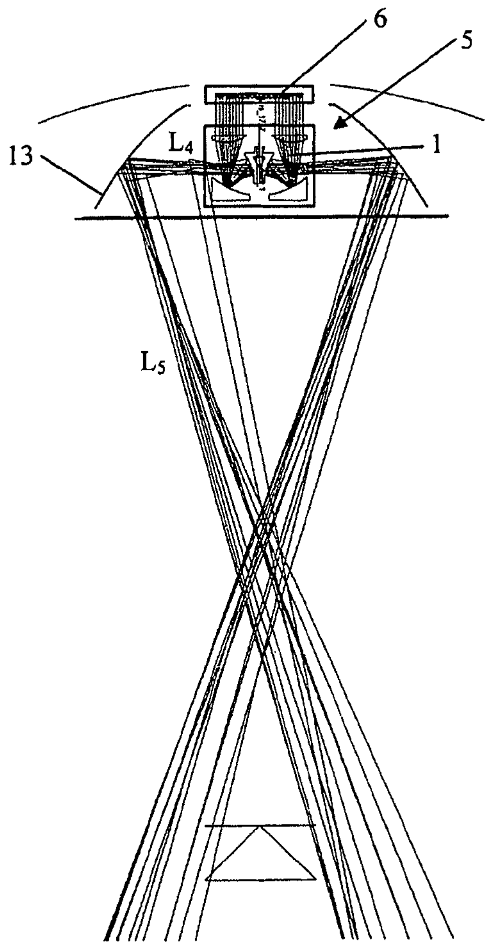

A beam emitted from the LED light source unit 6 is transformed into an output beam L4 after light mixing and angle modification by the zoom unit 1 (see FIG. 4 and FIG. 5). According to one aspect of the present invention, light engine including LED source unit is used to replace the traditional halogen lamp, on the other aspect, the zoom unit provided by present invention is used to mix the beam emitted from the light source sufficiently with smallest light loss, while at the same time, the outer profile of the reflecting cover 13 of the illuminating apparatus according to the present invention does not need to be changed. Thereby, the object of widely applying the light engine with the LED in various fields can be achieved, and especially in a situation that light efficiency and light intensity are particularly required, such as in the field of surgery, the illuminating apparatus according to the present invention can be used as a lamp producing uniform and shadowless illumination.

Next, the LED light source unit 6 and the zoom unit 1 pro-vided by present invention may be described more detailed, respectively.

It is shown in FIG. 1 that the zoom unit 1 receives collimated beams from the LED light source units 6 and modifies these beams. The zoom unit 1 comprises a lens 2, a first reflector 3 and a second reflector 4. Lens 2, first reflector 3 and a second reflector 4 may be one or more. What is important is that the lens 2, or the first reflector 3 or the second reflector 4 is configured to be rotationally symmetric, or a plurality of lenses 2, or a plurality of first reflectors 3 or a plurality of second reflectors 4 are distributed in a manner of rotationally symmetric to each other so as to 1 realize a final good converging effect of the beams. In the present embodiment, the lens 2 preferably is configured as a donut lens 2 rotationally symmetric for receiving a collimated beam LI from the LED light source unit 6 (see FIG. 4 and FIG. 5) so as to converge the collimated beam LI to a greatest degree and avoid the light loss. The first reflector 3 preferably is configured as a faceted disk reflector arranged corresponding to the lens 2 and reflects a beam converged by the lens 2 to a reflecting surface of the second reflector 4 through a reflecting surface towards the lens 2 and the second reflector 4. The second reflector 4 preferably is configured to be in a horn shape, wherein one end of the second reflector 4 towards the first reflector 3 is a small diameter end, and the other end towards the LED light source unit 6, i.e. towards the lens 2, is a big diameter end. The second reflector 4 is located in a center of the zoom unit 1, deviated from a light path from the lens 2 to the first reflector 3, and surrounded by the lens 2 and the first reflector 3 symmetrically. The second reflector 4 provides a zoom beam with a small light loss to the reflecting cover 13 rotationally and symmetrically arranged so as to make the beam produce a good converging effect upon a final reflection by the reflecting cover.

Figure 2:
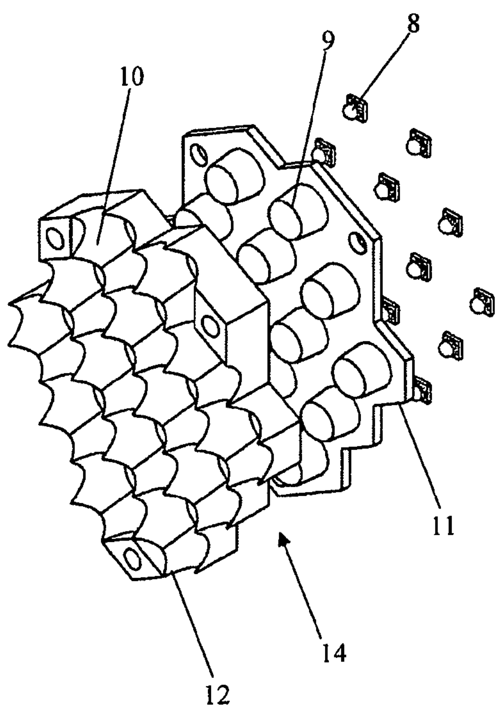
FIG. 2 is an exploded perspective view of a single LED Light source module of an LED light source unit according to an embodiment of the present invention, in which the LED Light source module has a plurality of LED sub light source units.

FIG. 2 is an exploded perspective view of a single LED Light source module of an LED light source unit according to the present invention, in which the LED Light source module has a plurality of LED sub light source units. It can be seen from FIG. 2 that the LED light source unit 6 comprises a plurality of LED sub light source units 7 each comprising at least one LED 8 and an optical device configured to modify beams from respective LEDs to appropriately collimated beams. In the present embodiment, the optical device includes a lens 9 and at least one primary reflector 10 arranged at an outer periphery of each lens 9. Preferably, one LED 8 corresponds to one lens 9 and one primary reflector 10. At least one, preferably a plurality of lens boards 11 and at least one, preferably a plurality of primary reflector boards 12 are provided, each lens board 11 is provided with a plurality of lenses 9 in a cylinder shape, and each primary reflector board 12 is provided with the primary reflector 10 in a number corresponding to that of the lens on each lens board 11. Each lens board 11, primary reflector board 12 and LED 8 are independent parts, so as to be simply combined for use to form a LED light source unit 6 from LED light source modules 14. Moreover, corresponding parts may be changed respectively if the illuminating apparatus is failed or to be updated, so that the maintenance cost is reduced and the assembling process is simplified. A plurality of LED light source modules 14 may be assembled to obtain different kinds of brightness so that the LED light source modules 14 is additionally provided or dismantled according to usage requirements.

In a preferred embodiment, the lens 9 is a total internal reflection lens; thereby the light efficiency of the whole illuminating apparatus may be improved. The lens 9 herein is configured to be in a cylinder shape, which not only uses its inherent optical characteristics but also takes it as a protecting cover to accommodate one or more LEDs 8 therein, satisfying the requirement of protecting an LED chip. A cross section of the primary reflector 10 for accommodating the lens 2 is configured to be in a hexagonal shape constructed by six reflecting portions each forming an edge of the hexagonal shape. Preferably, a side wall of each primary reflector 10 meanwhile is configured to restrict another adjacent primary reflector 10, thus, the respective primary reflectors 10 are connected with each other to form a honeycomb layout. The lens 2 is located in a corresponding primary reflector 10, and preferably, in a center thereof, to render a compact layout and uniform beam.

Figure 3:
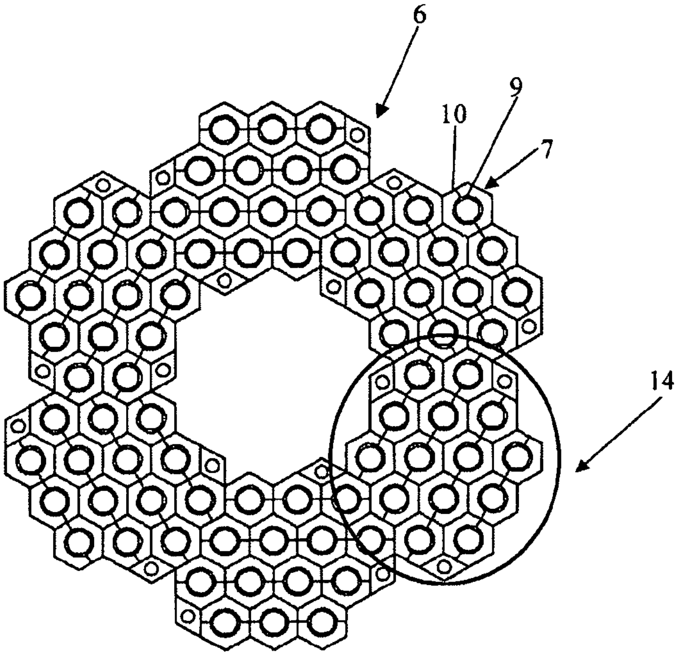
FIG. 3 is a sectional view of a light source unit of a light engine according to an embodiment of the present invention.

FIG. 3 is a sectional view of a light source unit according to the present invention. A honeycomb LED light source unit 6 is formed by six LED light source modules connected with each other, wherein each LED light source module 14 is composed of one lens board 11 with a plurality of lens, one primary reflector board 12 with a plurality of primary reflectors and a plurality of LEDs 8. Upon an optimized solution, the arrangement above may realize a compact arrangement of the light source unit in a condition of a fixed structure dimension, thereby obtaining a higher light efficiency. And a relatively uniform emergent beam also may be obtained based on the symmetric property of the honeycomb structure.

FIG. 4 is a light path diagram of an illuminating apparatus according to the present invention. It can be seen clearly therefrom that a beam emitted from the LED 8, upon modification by corresponding optical devices, i.e. the lens 9 in a cylinder shape and the primary reflector 10 with a cross section in a hexagonal shape, is incident in the lens 2 in the zoom unit 1 in a form of approximately collimated beam LI. The collimated beam LI, after converged by the lens 2, is formed into a convergent beam L2 that is incident in concentration to a reflecting surface of the first reflector 3. As the reflecting surface of the first reflector 3 is also oriented to the second reflector 4 in the center of the zoom unit 1, a beam L3 reflected by this reflecting surface therefore is incident uniformly to the second reflector 4 in a horn shape. The second reflector 4 gradually gets thicker from one end close to the first reflector 3 to one end close to the lens 2. The beam L3, after reflected by the second reflector 4 herein, forms an output beam L4. The approximately straight beam L4 emitted from the light engine 5 may be reflected on the inner wall of the reflecting cover 13, which can preferably obtain the effect with different focusing areas similar to that of the shadowless lamp or other expected illuminating effect, by correspondingly modifying relative positions of the LED light source unit 6 and the zoom unit 1, and modifying an orientation of an reflecting surface of each reflector of the zoom unit 1 and an orientation of the reflecting cover 13.

FIGS. **5*a*-5*c* are light path diagrams in three different embodiments of an illuminating apparatus according to the present invention. In FIG. 5*a*, a distance between the light source unit 6 and the zoom unit 1 is quite small, thereby an emergent beam L5 with a far focus is obtained. In FIG. 5*b*, a distance between the light source unit 6 and the zoom unit 1 becomes bigger than that in FIG. 5*a*, thereby an emergent beam L5 with a relatively close focus is obtained. And in FIG. 5***c*, a distance between the light source unit 6 and the zoom unit 1 is the biggest, thereby an emergent beam L5 with the closest focus is obtained. Of course, the illuminating apparatus according to the present invention may be further modified according to specific requirements in practical application to obtain a desired light distribution and satisfactory light efficiency.

The above describes preferred embodiments of the present invention but is not intended to limit the present invention. For the person skilled in the art, the present invention may have various alterations and changes. Any alterations, equivalent substitutions, improvements, within the spirit and principle of the present invention, should be covered within the scope of the present invention as defined by the following claims.

The invention claimed is:

1. An illuminating apparatus comprising: a light source capable of emitting a collimated beam of light;

a converging lens positioned to directly receive the collimated beam of light emitted from the light source, the converging lens capable of converging light entering the converging lens from the light source, the converging lens being a donut lens that is rotationally symmetric about a central axis;

a first reflector positioned to directly receive, on a reflecting surface thereof, the converging light emitted from the converging lens and shaped so as to change a propagation direction of light striking the first reflector substantially toward the central axis, the first reflector being ring-shaped that is rotationally symmetric about the central axis, the reflecting surface of the first reflector being concave toward the converging lens and being formed as a faceted surface;

a second reflector positioned on the central axis to directly receive, on an outer reflecting surface thereof, the light reflected by the first reflector and shaped so as to change a propagation direction of light striking the second reflector to be directed away from the central axis, the second reflector being positioned offset from a light path between the converging lens and the first reflector, the outer reflecting surface of the second reflector having a conically shaped outer surface with a larger end thereof being closer to the converging lens than a smaller end thereof, and a third reflector positioned to directly receive, on a reflecting surface thereof, the light reflected by the second reflector and shaped so as to change a propagation direction of light striking the third reflector to converge at a converging area spaced from the third reflector substantially on the central axis.

2. The illuminating apparatus of claim 1, wherein the light source comprises a plurality of LED sub light source units.

3. The illuminating apparatus of claim 2, wherein each of the plurality of LED sub light source units comprises an LED and an optical device corresponding to each respective LED, the optical device being configured to modify light emitted from the respective LED substantially into a collimated beam.

4. The illuminating apparatus of claim 3, wherein the optical device comprises, for each respective LED, a lens positioned to receive light emitted by the respective LED, and a primary reflector positioned to receive light emitted by the lens.

5. The illuminating apparatus of claim 4, wherein each lens of the optical device has a substantially cylindrical shape.

6. The illuminating apparatus of claim 4, wherein each lens of the optical device is a total internal reflection lens.

7. The illuminating apparatus of claim 4, wherein the optical device further comprising a lens board onto which the lenses of the optical device are mounted.

8. The illuminating apparatus of claim 4, wherein a cross section of each primary reflector is a hexagon, and wherein each primary reflector is formed by six reflecting portions, each portion forming a side of the hexagon.

9. The illuminating apparatus of claim 8, wherein each lens of the optical device is positioned within a respective primary reflector within the six sides of the hexagon.

10. The illuminating apparatus of claim 9, wherein each lens of the optical device is positioned at a center of the respective primary reflector.

11. The illuminating apparatus of claim 8, wherein the primary reflectors are connected to one another to form a honeycomb layout.

12. The illuminating apparatus of claim 11, wherein the optical device further comprises a primary reflector board onto which the primary reflectors among all the primary reflectors of the optical device are mounted.

13. The illuminating apparatus of claim 12, wherein the primary reflector is mounted onto the lens board.

14. The illuminating apparatus of claim 13, comprising six LED sub light source units arranged in an approximately hexagonal shape.

15. The illuminating apparatus of claim 3, wherein the plurality of LED sub light source are arranged in a honeycomb layout.

16. The illuminating apparatus of claim 3, wherein a distance between the light source and converging lens is adjustable so as to adjust a location of the converging area.

17. The illuminating apparatus of claim 3, wherein the LED sub light source units are positioned substantially in a plane perpendicular to the central axis.

* * * * *